July 23, 1957 T. W. MERRITT 2,800,134
MILK PIPE LINE WASHING SYSTEM
Filed Sept. 16, 1954 2 Sheets-Sheet 1

Inventor
Thomas W. Merritt
By Schroeder, Hofgren, Brady & Wegner
Attorneys

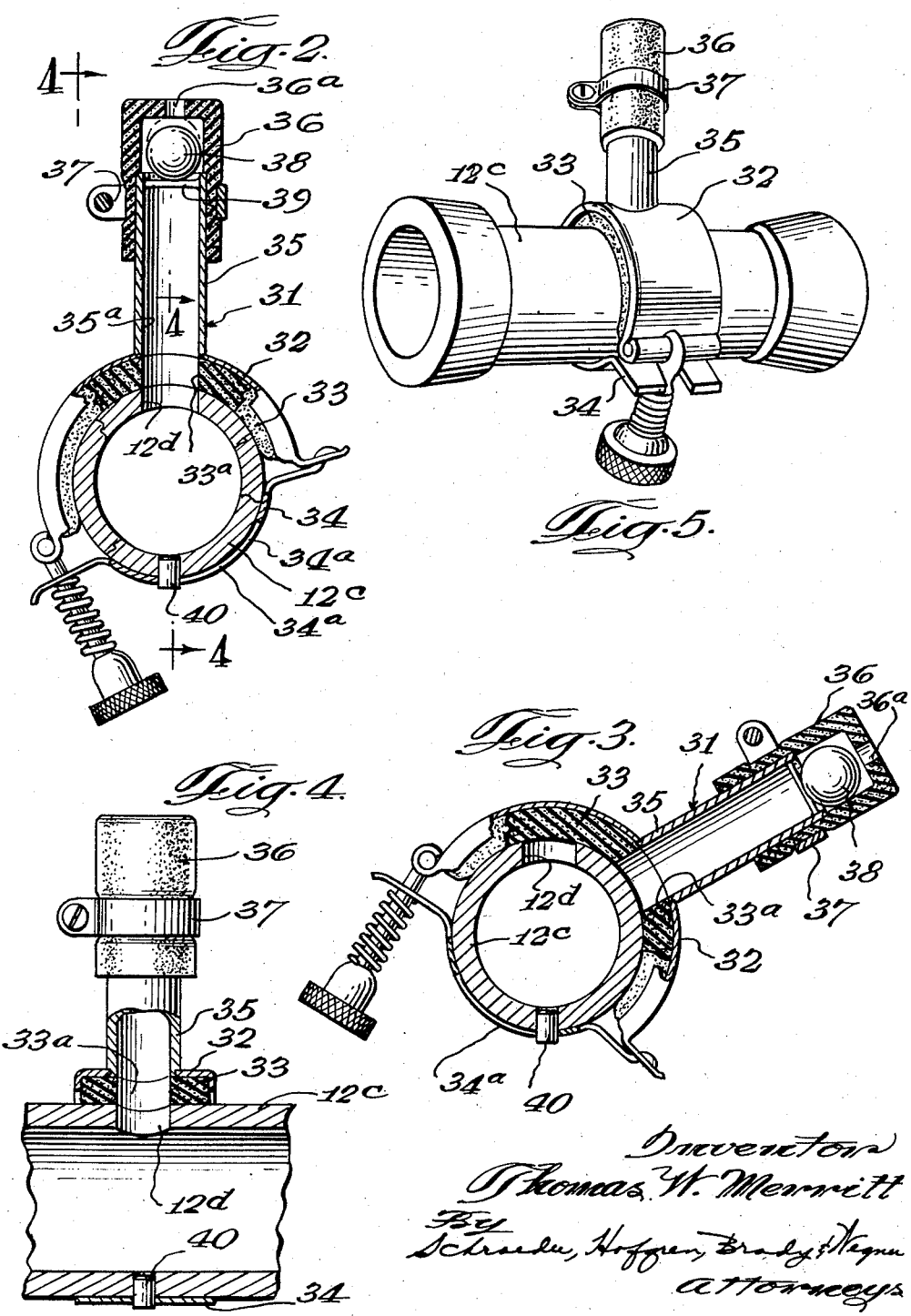

United States Patent Office 2,800,134
Patented July 23, 1957

2,800,134

MILK PIPE LINE WASHING SYSTEM

Thomas W. Merritt, St. Charles, Ill., assignor to Babson Bros. Co., a corporation of Illinois Application September 16, 1954, Serial No. 456,359

6 Claims. (Cl. 134—168)

This invention is concerned with a milk pipe line washing system and more particularly with an improved system for speeding the washing operation.

Carry-away milk pipe line systems are becoming increasingly popular with dairy farmers and are replacing many bucket milking operations. It is necessary that milk pipe line systems be completely washed and sanitized following each milking operation, that is normally twice daily. The washing and sanitizing operation, although subject to some local variations, generally consists of flushing the line with cold water, washing it with a hot detergent solution and lastly disinfecting it with a suitably sanitizing solution. It is necessary between each of these steps to drain the line of one liquid before the next is passed therethrough. As good pipe lines are substantially air-tight, considerable time is often wasted waiting for the line to drain. It is of course desirable that the washing operation be carried on with as little delay as possible to free the farmer for other chores.

I have devised and disclose and claim herein a novel washing system which speeds the draining of the pipe line and thus facilitates the washing operation.

One feature of the invention is the provision of a washing system for a pipe line milker comprising a milk pipe line, means for passing a washing solution through the pipe line under pressure, and means for automatically venting the system when pressure is relieved on the washing solution. Another feature is that the pipe line and the means for passing the washing solution therethrough form a closed, recirculating system. A further feature is that the automatic venting means are provided at the high point of the pipe line.

Yet another feature is that the milk pipe line has an opening therein, means for passing a washing solution therethrough under pressure, a check valve connected with the opening for automatically venting the system when pressure is relieved on the washing solution and means intermediate the check valve and the opening for sealing the opening.

Further features and advantages will readily be apparent from the following specification and from the drawings, in which:

Figure 2 is a cross section showing the venting means or check valve in communication with the pipe line;

Figure 3 is a view similar to Figure 2 with the opening in the pipe line sealed;

Figure 4 is a view partly in section and partly in elevation taken along line 4—4 of Figure 2; and Figure 5 is a perspective view of a section of the pipe line with the check valve mounted thereon.

Figure 1:
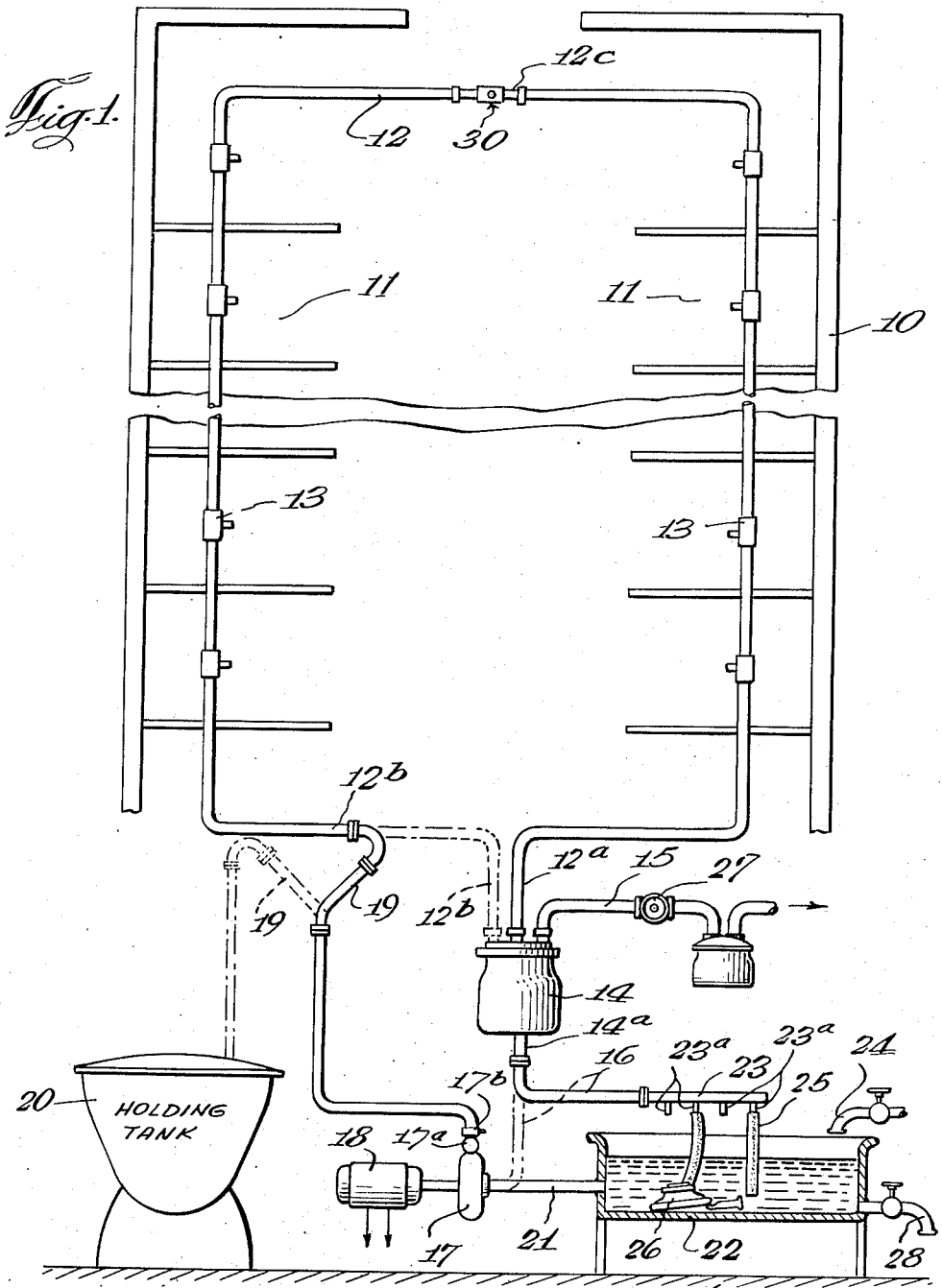
Figure 1 is a diagrammatic view of a pipe line milking system connected for washing in accordance with the invention.

Carry-away milking systems utilizing milk pipe lines come in many different forms and are adapted for use on many types of dairy farms, from those having three or four milking stalls (as in a milking parlor) where a relatively small number of cows are milked, to the large establishments where over one hundred cows may be milked simultaneously and the milking operation is carried on practically around the clock. Some of the problems involved in washing and sanitizing the milking system are the same however regardless of the size and the invention to be described herein may be utilized with many types of milking systems, as will be apparent.

The invention is shown in Figure 1 as incorporated in one particular carry-away milking system wherein a barn 10 is provided with a plurality of stalls 11. A milk pipe line 12, of stainless steel or glass, extends around the outer periphery of the barn, above the stalls 11 and may be provided with individual stall cocks 13, of suitable design. During milking, both ends, 12a and 12b, of the pipe line 12 are connected to a milk receiver 14 to which is also connected a vacuum line 15, thus providing two milk delivery lines. The ultimate vacuum source, such as a vacuum pump and chamber, is not shown. During milking the outlet 14a of receiver 14 is connected through a section of pipe 16 to the inlet of a rotary centrifugal pump 17, which is driven by a motor 18. The outlet of pump 17 may be connected through suitable piping, including a swing joint 19, to a large holding tank 20.

The milk is drawn from the individual cows (not shown), through pipe line 12 into chamber 14 by virtue of the vacuum maintained therein. The milk may be removed from the evacuated portion of the system and transferred to the holding tank 20 by pump 17. A check valve 17a at the outlet of pump 17 prevents back flow through the pump (due to vacuum in the system) when the pump is not operating. Further details of the operation of this phase of the milking system may be found in copending Babson application, Serial No. 229,185, filed May 31, 1951, assigned to the assignee of this application and now abandoned. After the milking is finished, and the milk in pipe line 12 and receiver 14 is transferred to holding tank 20, the milk remaining in the pump outlet pipe may be drained into a suitable container through milk drain valve 17b.

When the milking operation is completed the system is readied for washing by several simple changes in the piping arrangement. The short section of pipe 16 is disconnected from the outlet of milk receiver 14 and the inlet of pump 17 and reversed in position as shown in solid lines of Figure 1 with the short end thereof connected to the outlet of milk receiver 14 and the long end extending outwardly over a reservoir tank 22. A manifold 23 having a plurality of nipples 23a is attached to the end of pipe section 16. The inlet of pump 17 is connected to the reservoir by a length of pipe 21. The end 12b of the milk pipe line is disconnected from the milk receiver 14 and the opening in the receiver lid capped. The outlet of pump 17 is disconnected from holding tank 20 and connected through swing joint 19 to the end 12b of the pipe line. The reservoir 22 is then filled with the first washing solution, generally cold water, from a tap 24. The check valve 30 which is the subject of this application is also rendered operative, as is more fully described hereafter. If desired, check valve 17a may be rendered inoperative during the washing operation.

The pump 17 may now be started and operated continuously to force the washing solution from reservoir 22 through the pipe line 12 and back into the reservoir through receiver 14, pipe section 16 and manifold 23. If desired, milk tubes 25 or the entire milk withdrawing apparatus 26 may be connected to the nipples 23a on the manifold and immersed in the reservoir 22 so that the washing solution flows through them and they are automatically washed along with the pipe line.

The vacuum which is applied to the system through vacuum line 15 during milking is preferably removed during the washing operation as by closing valve 27, After the first washing solution has circulated through the system for the desired period of time, usually specified by local milk ordinances, the pump is stopped and the liquid in the pipe line is allowed to drain back into reservoir 22. The reservoir may be emptied through drain 28. Inasmuch as the pipe line 12 should be as nearly air-tight as possible, the draining of the pipe line may take a considerable amount of time.

In order to facilitate draining of the pipe line and thus to speed up the washing operation it is proposed that means 30 be provided for automatically venting the system when the pressure is relieved on the washing solution (i. e., when pump 17 is stopped).

Referring now to Figures 2–5, a preferred embodiment of the venting means will be described in detail. A section 12c of pipe is provided with an opening 12d in the upper surface thereof. This section of pipe may be placed in the line at the highest point thereof; as shown in Figure 1 this is intermediate the two milk delivery sections of the pipe line which extend down either side of the barn 10 while in many smaller installations, the high point will be found at the end of the pipe line remote from milk receiver 14. If, however, the vent is not placed exactly at the highest point in the line, siphon action will still cause the line to drain properly.

Check valve assembly 31, which includes an arcuate body member 32 carrying a resilient sealing element 33, is rotatably mounted on the pipe line by a retainer strap 34. A tube 35 is secured to arcuate body 32 and extends outwardly therefrom, the interior 35a of tube 35 communicating through an opening 33a in the sealing element 33 with opening 12d in the pipe line when the valve assembly is positioned as shown in Figure 2. A cup-shaped member 36 preferably of a resilient material such as rubber, is secured to the end of the tube 35 by a clamp 37. The closed end of the cup has a small vent opening 36a therethrough, providing a valve seat.

A ball 38, which may be of any suitable material such as nylon, is supported within cup-shaped end member 36 by a pin 39 carried in the walls of tube 35. When a washing solution is flowing through the pipe line 12 under pressure, ball 38 is forced upwardly and seated in the opening 36a of the cup-shaped member 36 sealing the pipe line system, as shown in broken lines, Figure 2. As soon as the pressure is relieved on the washing solution as by shutting down pump 17, ball valve 38 drops down on pin 39 venting the pipe line to the atmosphere through opening 36a. This permits the washing solution in the pipe line to flow back rapidly through the pipe line 12 and both receiver 14 and pump 17 (if check valve 17a is inoperative) into reservoir 22, emptying the pipe line in a very short time. In the event the farmer prefers not to disable check valve 17a during washing, milk drain valve 17b may be opened allowing a portion of the pipe line to empty therethrough into a floor drain or other receiver (not shown).

During the regular milking operation, the entire assembly 31 is rotated to the position shown in Figure 3 so that the resilient seal 33 carried by body member 32 closes opening 12d, sealing the pipe line. A pin 40 may be secured to pipe section 12c and extend outwardly therefrom through a slot 34a in retainer member 34 to limit the movement of the check valve assembly and insure proper positioning thereof at all times. At the beginning of the washing operation this assembly would be manually moved by the farmer to the position illustrated in Figure 2; and thereafter it would operate automatically during the various phases of the washing operation.

The check valve 31 has certain parts analogous to those of the stall cock described and claimed in detail in copending Thomas application, Serial No. 319,812, filed November 12, 1952, and reference may be had thereto for further details of this unit.

While I have shown and described certain embodiments of my invention, it is to be understood that it is capable of many modifications. Changes therefore, in the construction and arrangement may be made without departing from the spirit and scope of the invention as disclosed in the appended claims.

I claim:

1. A washing system of the character described for a carry-away milk pipe line, comprising: means for passing a washing solution through said pipe line under pressure, said means and said pipe line forming a closed, recirculating system; and means operably connected with said milk pipe line for automatically venting the entire pipe line to atmosphere when the pressure on the washing solution is removed, permitting the solution to drain therefrom.

2. A washing system of the character described for a carry-away milk pipe line, comprising: a pump connected to said line for forcing a washing solution therethrough under pressure; and means connectable to said pipe line for automatically venting said pipe line on either side of the point of connection when said pump is stopped, removing the pressure from the washing solution.

3. A washing system of the character described for a carry-away milk pipe line having two ends and an intermediate portion, comprising: a reservoir for washing solution; a pump having an inlet connected to said reservoir and an outlet connected to one end of said pipe line for forcing washing solution therethrough under pressure, the other end of said pipe line emptying into said reservoir; and means connectable to the intermediate portion of said pipe line for automatically venting said system on either side of the point of connection when said pump is stopped relieving the pressure on the washing solution therein, permitting the solution to drain into said reservoir through said pipe line and through said pump.

4. A washing system of the character described for a pipe line milking system, comprising: a section in said pipe line having an opening therein; means for passing a washing solution through said pipe line under pressure; a check valve connected with said opening for automatically venting said system when the pressure is relieved on the washing solution; and means intermediate said check valve and said opening for sealing said opening.

5. A washing system of the character described for a milk pipe line having an opening in the wall thereof, comprising: means for passing a washing solution through said pipe line under pressure; a check valve assembly mounted on said pipe line for movement into and out of communication with said opening for automatically venting the entire pipe line on both sides of said check valve when the pressure is relieved on the washing solution, said assembly including means for sealing said opening when the check valve is out of communication therewith.

6. A system of the character described in claim 5, wherein said opening is in the top surface of the wall of said pipe line and said check valve comprises a body member rotatably mounted on said pipe line, having a resilient seal therebetween, and a tube extending outwardly therefrom and communicating with said opening when in a generally upright position, said tube having a restricted end portion forming a valve seat, there being a valve member thereinside, said seal closing said opening when said body member is rotated to another position.

References Cited in the file of this patent

UNITED STATES PATENTS

| | | |
|---|---|---|
| 2,144,560 | Bean | Jan. 17, 1939 |
| 2,222,516 | Powell | Nov. 19, 1940 |
| 2,502,211 | Dyer | Mar. 28, 1950 |
| 2,685,884 | Heckendorf | Aug. 10, 1954 |
| 2,690,734 | Heckendorf | Oct. 5, 1954 |
| 2,690,756 | St. Palley | Oct. 5, 1954 |